United States Patent
Sasamoto et al.

(10) Patent No.: US 11,650,052 B2
(45) Date of Patent: May 16, 2023

(54) IMAGING DEVICE

(71) Applicant: Hitachi Automotive Systems, Ltd., Hitachinaka (JP)

(72) Inventors: Manabu Sasamoto, Tokyo (JP); Takeshi Shima, Tokyo (JP); Shinichi Nonaka, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 1217 days.

(21) Appl. No.: 16/066,274

(22) PCT Filed: Jan. 10, 2017

(86) PCT No.: PCT/JP2017/000362
§ 371 (c)(1),
(2) Date: Jun. 26, 2018

(87) PCT Pub. No.: WO2017/134982
PCT Pub. Date: Aug. 10, 2017

(65) Prior Publication Data
US 2020/0284580 A1   Sep. 10, 2020

(30) Foreign Application Priority Data

Feb. 4, 2016 (JP) .............................. JP2016-019401

(51) Int. Cl.
*G06V 20/58* (2022.01)
*G06V 20/59* (2022.01)
(Continued)

(52) U.S. Cl.
CPC .................. *G01C 3/14* (2013.01); *G01C 3/06* (2013.01); *G06T 7/593* (2017.01); *G06V 20/58* (2022.01); *G06V 20/582* (2022.01)

(58) Field of Classification Search
None
See application file for complete search history.

(56) References Cited

U.S. PATENT DOCUMENTS

2008/0089557 A1   4/2008   Iwaki et al.
2009/0244263 A1   10/2009  Saito
(Continued)

FOREIGN PATENT DOCUMENTS

CN      102997900 A      3/2013
DE   10 2008 053 472 A1   6/2009
(Continued)

OTHER PUBLICATIONS

Extended European Search Report issued in counterpart European Application No. 17747146.3 dated Aug. 6, 2019 (eight (8) pages).
(Continued)

*Primary Examiner* — Samuel D Fereja
(74) *Attorney, Agent, or Firm* — Crowell & Moring LLP

(57) ABSTRACT

The purpose of the present invention is to provide an imaging device whereby enhanced sensing precision and reduced computational load can both be achieved at the same time even when a plurality of objects as sensing subjects are present. In order to achieve this purpose, the present invention has: a first object detection processing unit having a plurality of imaging units, the first object detection processing unit performing first object detection processing for sensing, by stereo processing, a distance for each of a plurality of image elements in partial region of interest in an image acquired by the imaging units, then extracting a group of the image elements on the basis of the sensed distances and detecting an object; and a second object detection processing unit for performing second object detection processing for detecting the distance of the object by stereo processing for a partial region of another region of interest in the image.

7 Claims, 7 Drawing Sheets

(51) Int. Cl.
  *G01C 3/14* (2006.01)
  *G06T 7/593* (2017.01)
  *G01C 3/06* (2006.01)

(56) References Cited

U.S. PATENT DOCUMENTS

| | | | |
|---|---|---|---|
| 2012/0327189 A1 | 12/2012 | Muramatsu et al. | |
| 2013/0073194 A1 | 3/2013 | Nakamura et al. | |
| 2015/0036886 A1* | 2/2015 | Matono | G08G 1/166 |
| | | | 382/106 |
| 2017/0024875 A1* | 1/2017 | Ishigami | G06V 10/25 |
| 2017/0039434 A1 | 2/2017 | Shima et al. | |
| 2018/0267142 A1* | 9/2018 | Motoyama | G06T 7/74 |
| 2018/0285661 A1* | 10/2018 | Amano | G08G 1/16 |
| 2018/0330481 A1* | 11/2018 | Watanabe | G06T 7/285 |

FOREIGN PATENT DOCUMENTS

| | | |
|---|---|---|
| EP | 3 211 368 A1 | 8/2017 |
| JP | 2000-331148 A | 11/2000 |
| JP | 2006-322795 A | 11/2006 |
| JP | 2011-191905 A | 9/2011 |
| JP | 2013-58829 A | 3/2013 |
| WO | WO 2015/163078 A1 | 10/2015 |

OTHER PUBLICATIONS

Chinese-language Office Action issued in Chinese Application No. 201780006341.1 dated Feb. 25, 2020 with English translation (15 pages).

Japanese-language International Search Report (PCT/ISA/210) issued in PCT Application No. PCT/JP2017/000362 dated Apr. 25, 2017 with English translation (four (4) pages).

Japanese-language Written Opinion (PCT/ISA/237) issued in PCT Application No. PCT/JP2017/000362 dated Apr. 25, 2017 (three (3) pages).

* cited by examiner

FIG. 6
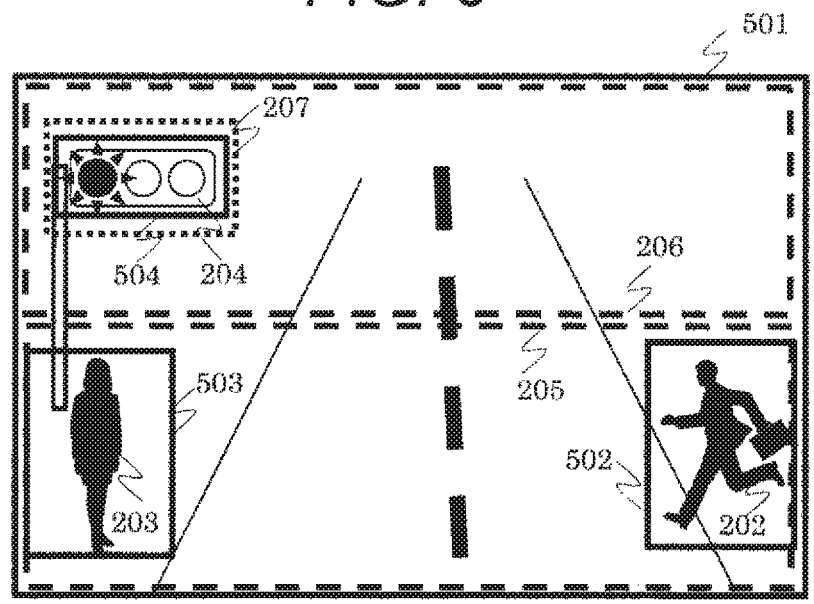
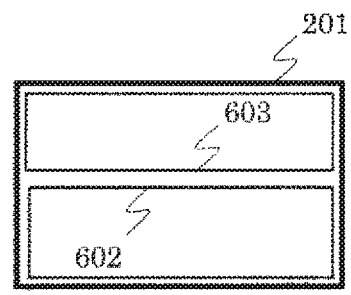
FIG. 7A
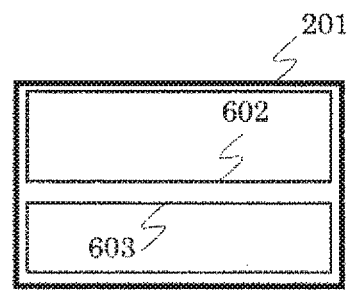
FIG. 7B
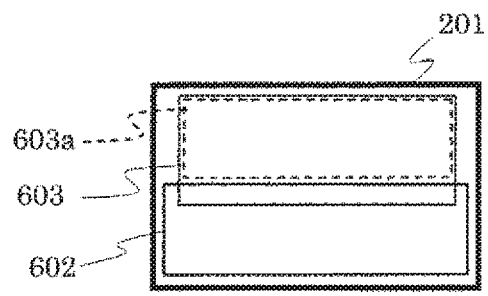
FIG. 7C
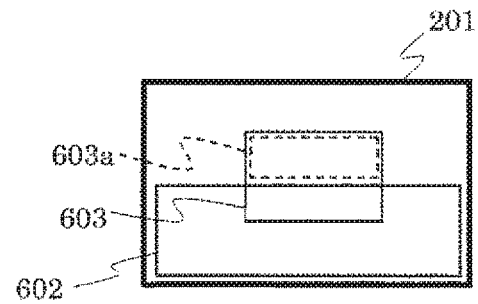
FIG. 7D

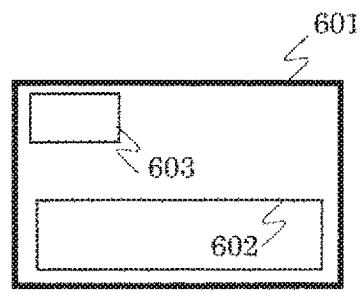
FIG. 9A
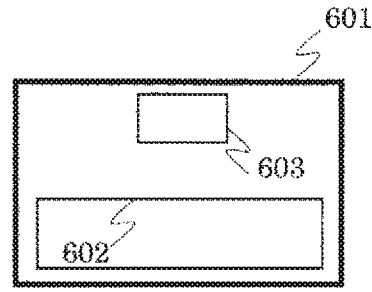
FIG. 9B
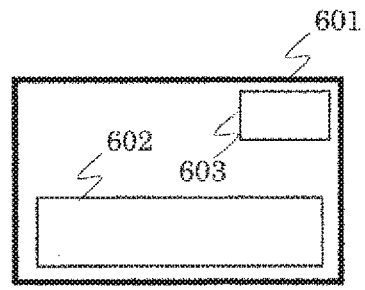
FIG. 9C
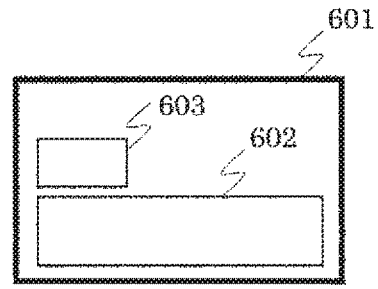
FIG. 9D
FIG. 10
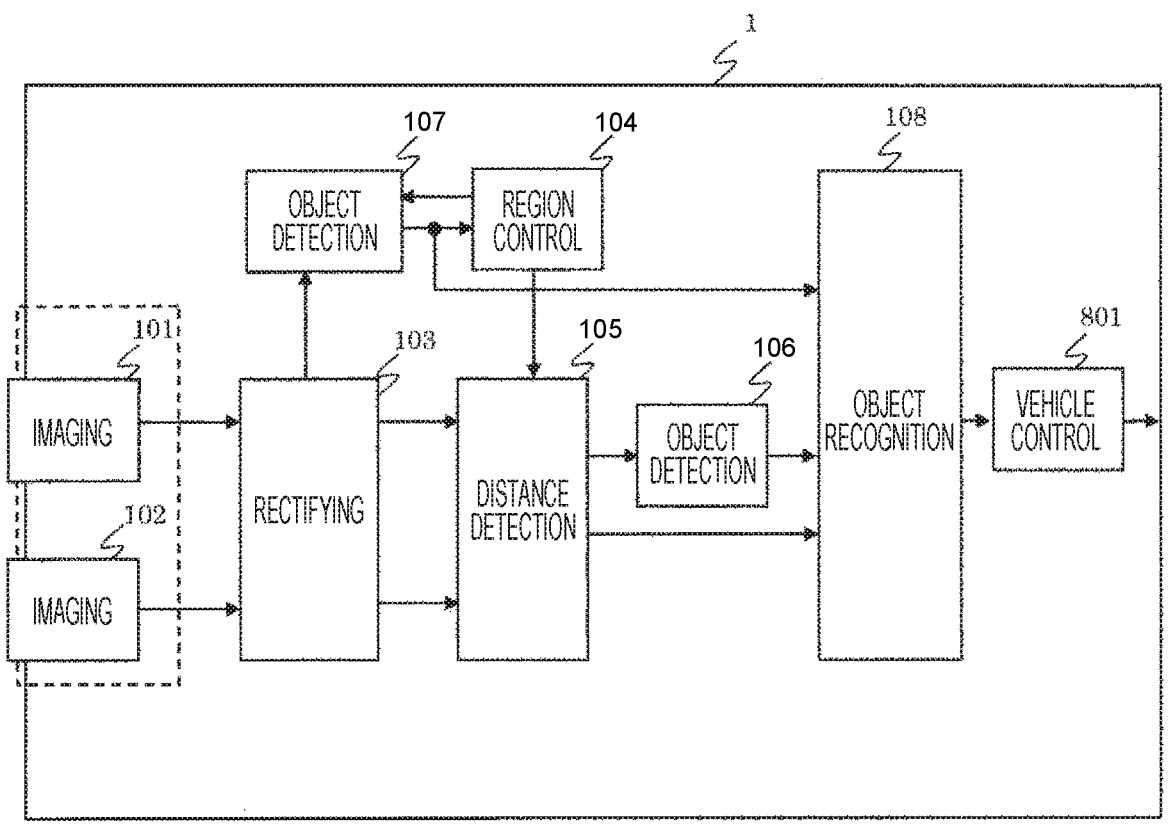

IMAGING DEVICE

TECHNICAL FIELD

The present invention relates to an imaging device.

BACKGROUND ART

As a background art of this technical field, for example, PTL 1 suggests a method using both distance detection by a stereo camera and distance detection by a monocular camera.

Specifically, PTL 1 describes that a distance between a vehicle and a target object is first detected by distance detection by a monocular camera, a computation amount is suppressed, and a position of the target object is tracked and when the distance between the vehicle and the target object is a preset switching distance or less, the distance detection is switched into distance detection by a stereo camera and the position of the target object approaching the vehicle is recognized with higher precision.

In addition, PTL 1 describes that the computation amount is smaller in the case of using the monocular camera, while the sensing precision is higher in the case of using the stereo camera.

CITATION LIST

Patent Literature

PTL 1: JP 2013-058829 A

SUMMARY OF INVENTION

Technical Problem

Incidentally, technology described in PTL 1 can reduce a computational load when the number of objects to be sensing subjects is one. However, because the objects to be the sensing subjects are normally present in both a distant place and a near place, monocular processing and stereo processing must be performed for each of a plurality of objects. For this reason, the computational load may not be efficiently reduced.

Accordingly, an object of the present invention is to provide an imaging device that can achieve both enhanced sensing precision and reduced computational load at the same time, even when a plurality of objects to be sensing subjects are present.

Solution to Problem

The present invention provides an imaging device having a plurality of imaging units. In a first region which is a part of a common imaging region common to imaging images imaged by the plurality of imaging units, a distance for an image element in a partial region is calculated on the basis of a disparity between the plurality of imaging images over the entire first region and in a second region including another region different from the first region in the imaging images, for a partial region which is a part of the second region, a distance for an image element in the partial region is calculated on the basis of the disparity between the plurality of images.

Advantageous Effects of Invention

According to the present invention, it is possible to achieve both enhanced sensing precision and reduced computational load at the same time, even when a plurality of objects to be sensing subjects are present.

BRIEF DESCRIPTION OF DRAWINGS

FIG. 6 is a diagram showing an example of an imaging image and an object recognition result in the embodiment of the present invention.

FIGS. 7A to 7D are diagrams showing an example of region control in the embodiment of the present invention.

FIGS. 9A to 9D are diagrams showing another example of the region control in the embodiment of the present invention.

FIG. 10 is a diagram showing a configuration of an imaging device in another embodiment of the present invention.

DESCRIPTION OF EMBODIMENTS

Hereinafter, embodiments of the present invention will be described using the drawings.

Figure 1:
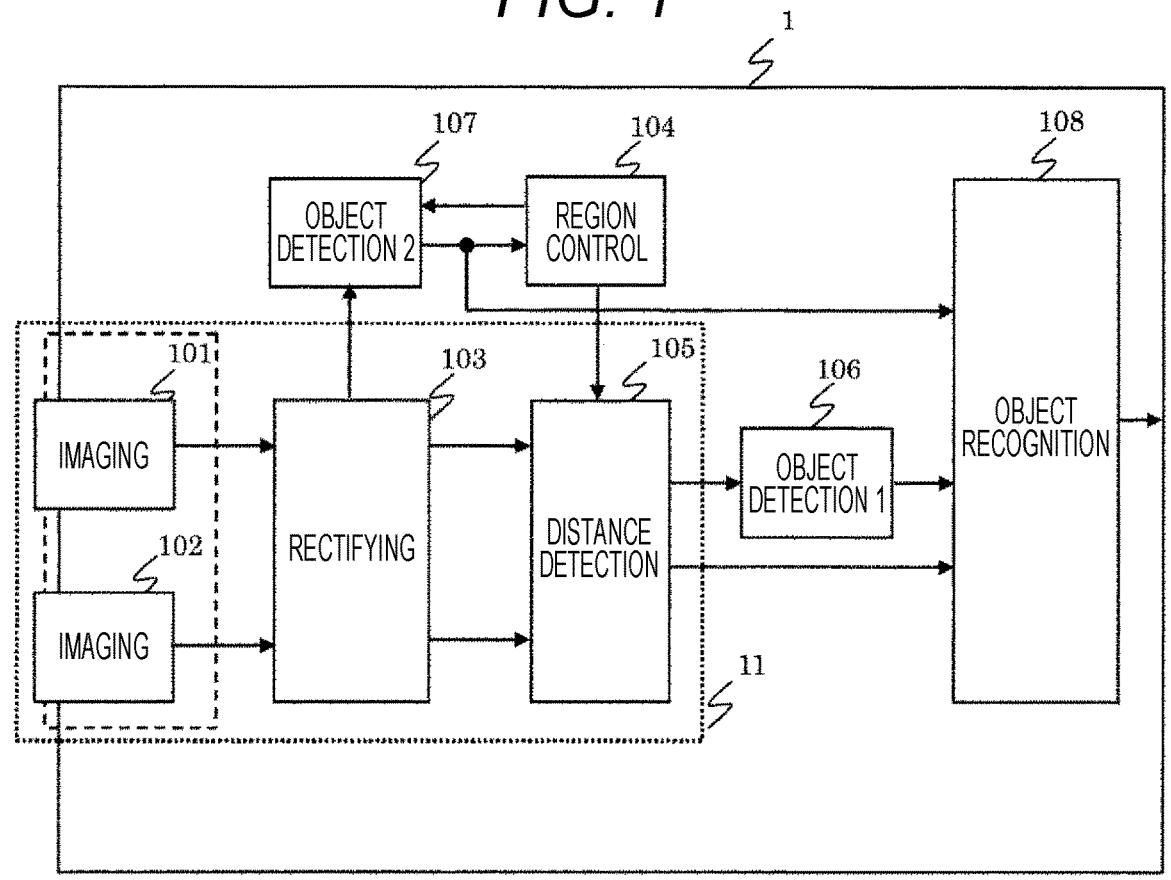
FIG. 1 is a diagram showing a configuration of an imaging device in an embodiment of the present invention.

FIG. 1 is a diagram showing a configuration of an embodiment of an imaging device according to the present invention. 1 denotes an imaging device according to this embodiment that is mounted on the front side of a vehicle and is configured as a part of a safety system for supporting a driver by recognizing signals, signs, obstacles, and the like.

101 and 102 denote imaging units and optical lenses are mounted on image sensors. These imaging units repeat imaging of one image at predetermined timing and output the imaged images.

The imaging unit 101 and the imaging unit 102 are installed to be separated from each other in a horizontal direction at a predetermined distance and can calculate a distance to a subject from a deviation of the images imaged by the imaging unit 101 and the imaging unit 102, a so-called disparity.

In FIG. 1, an example of the case where components of the imaging device 1 are stored in the same casing is shown. However, for example, the imaging units 101 and 102 may be collectively stored in a casing different from the casing storing other components (a frame shown by a dotted line in the same drawing) or the imaging units 101 and 102 may be stored in different casings, respectively, and attached to the vehicle. In this case, image signals may be connected by a connection cable not shown in the drawings. As a method of transmitting images using the connection cable, there is a transmission method using a differential transmission path of a low voltage differential signaling (LVDS) system or the like.

In addition, the image sensors of the imaging unit 101 and the imaging unit 102 are configured as color image sensors, so that it is possible to acquire color information of imaged images.

103 denotes an image rectifying unit that takes the images from the imaging units 101 and 102, rectifies the images with rectification values measured in advance to match brightness of the images, rectifies image distortion by lenses, rectifies the images of the imaging units 101 and 102 with rectification values measured in advance to match horizontal positions of the images, and stores the images in an image memory. The measurement of the rectification values is performed in a manufacturing process of the imaging device. In each device before an application of the rectification values, a brightness rectification value of each pixel is obtained such that a specific subject is imaged and brightness of the acquired image becomes uniform, a geometric rectification value of each pixel is obtained such that lens distortion is cancelled and the image becomes horizontal, and each of the brightness rectification value and the geometric rectification value is stored as a rectification table in a nonvolatile memory not shown in the drawings for each device.

104 denotes an region control unit that designates an region of an image to detect a distance in a distance detection unit 105 to be described later and outputs the region to the distance detection unit 105 and designates an region of an image to detect an object in an object detection unit 107 to be described later, outputs the region to the object detection unit 107, and receives a result detected by the object detection unit 107. That is, the region of the image to be distance-detected in the distance detection unit 105 is designated and the region of the image to be object-detected in the object detection unit 107 is designated.

105 denotes the distance detection unit that receives the images from the image rectifying unit 103 and detects the distance of the subject. As an example of a method of detecting the distance, there is the following method. The distance detection unit 105 takes the images from the image rectifying unit 103 and calculates a disparity. As described above, because the imaging unit 101 and the imaging unit 102 are installed to be separated from each other in the horizontal direction at the predetermined distance, the imaged images have the disparity. So-called stereo processing for calculating the disparity is performed. As an example of a method of calculating the disparity, there is a block matching method. For example, the distance detection unit 105 performs distance sensing for the region of the image designated by the region control unit 104 in the images from the image rectifying unit 103. Specifically, first, an region which corresponds to a block region of a predetermined size cut small from the image of the imaging unit 101 and in which the same subject on the image of the imaging unit 102 appears is searched in the horizontal direction. In addition, a difference of positions of matched block regions in the imaging unit 101 and the imaging unit 102 is the disparity. A distance of a target object appearing in the block region in a real environment can be calculated using the disparity. In this example, the block region is adopted as an image element to be distance-calculated. As a matching comparison method, for example, a position where a total sum of brightness differences of pixels in the block region decreases is taken as the disparity. It is well known that the distance can be obtained from lens focal distances of the imaging unit 101 and the imaging unit 102, a distance between the imaging unit 101 and the imaging unit 102, the obtained disparity, and a pixel pitch of an imaging sensor. However, a method of calculating the distance is not limited thereto. In addition, the image element to be distance-calculated is not limited to the block region and each pixel configuring the imaging sensor may be adopted.

106 is an object detection unit based on distance information that detects an object on the basis of the distance information of the region designated by the region control unit 104, obtained by the distance detection unit 105. In a method of detecting the object, for example, when distance information showing nearly the same distance exists nearby, these are grouped as one set, and when a size of the group is a constant value or more, the group is regarded as the object. For example, it is detected that the object is a vehicle or a pedestrian, on the basis of a size and a shape of the detected group. There is a method of detecting the size or the shape of the object from comparison with pattern data held in advance as reference data. According to this processing method, because a distance of a pedestrian or a vehicle in front of an own vehicle from the own vehicle is obtained with high precision, the distance is used as information for collision avoidance such as deceleration and stop of the own vehicle.

107 denotes another object detection unit that receives the image of either the imaging unit 101 or the imaging unit 102 and detects an object. As an example of a method of detecting the object, there is the following method. The object detection unit 106 takes the image of either the imaging unit 101 or the imaging unit 102 and detects an assumed traffic signal or road sign in the taken image. As an example of this detection method, there is a method of detecting an object such as a traffic signal or a road sign from a similarity amount between a brightness distribution or shape information of an edge in an image and pattern data held as reference data. As a result, the object in the image and the position on the screen thereof can be grasped.

The object detection unit 107 outputs a detection result to the region control unit 104 and the region control unit 104 designated an region to be distance-detected to the distance detection unit 105, on the basis of the result. The distance detection unit 105 performs the distance detection for the designated region in the image from the image rectifying unit 103 and outputs a result thereof to the object recognition unit 108 to be described later. As a result, an region of the distance detection by the distance detection unit 105 can be limited and an increase in processing load can be avoided.

108 denotes the object recognition unit that receives the detection results of the object detection unit 106, the object detection unit 107, and the distance detection unit 105, recognizes the object on the image, and outputs information of an object recognition result to the outside of the imaging device 1.

In the imaging device 1, for example, the imaging units 101 and 102, the image rectifying unit 103, and the distance detection unit 105 in a frame 11 shown by a dotted line are configured using an electronic circuit and the other components are realized by software processing by a microcomputer or the like not shown in the drawings.

Figure 2:
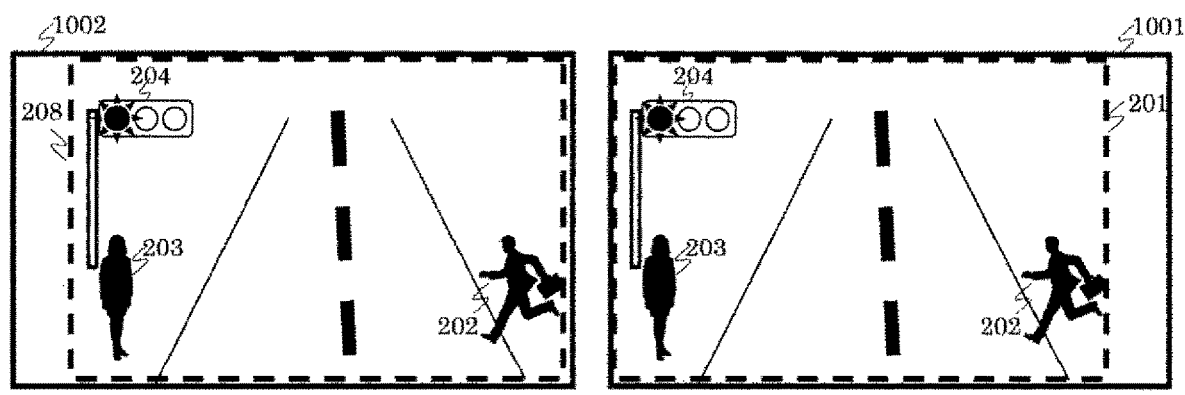
FIG. 2 is a diagram showing an example of an imaging image imaged in the embodiment of the present invention.

FIG. 2 is a diagram showing an example of an imaging image imaged in an embodiment of the imaging device according to the present invention. In the drawing, 1001 denotes an imaging image imaged by the imaging unit 101 and rectified by the image rectifying unit 103 and 1002 denotes an imaging image imaged by the imaging unit 102 and rectified by the image rectifying unit 103. 202, 203, and 204 denote subjects.

In addition, 201 and 208 denote common imaging regions that are commonly imaged regions in the imaging image 1001 and the imaging image 1002. As described above, there is a deviation between the imaging image 1001 and the imaging image 1002 in the commonly imaged regions and a distance of the subject is calculated on the basis of a deviation amount, that is, a disparity.

Figure 3:
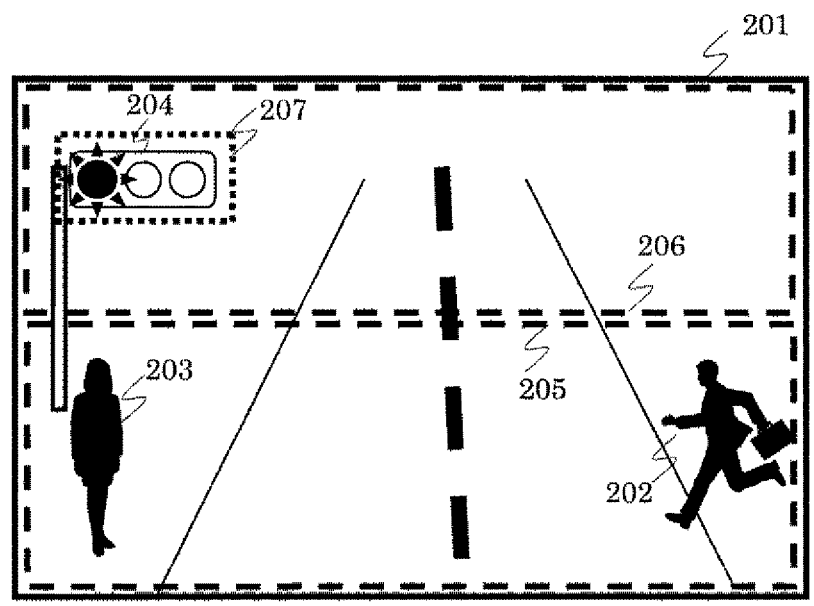
FIG. 3 is a diagram showing an example of an imaging image imaged in the embodiment of the present invention and region control.

FIG. 3 is a diagram showing an example of an imaging image imaged in an embodiment of the imaging device according to the present invention and region control. In the drawing, 201 denotes the region imaged in common with the image imaged by the imaging unit 102 as described above, in the imaging image imaged by the imaging unit 101 and rectified by the image rectifying unit 103.

205 and 206 are processing regions designated by the region control unit 104 in the imaging image 201 and the processing region 205 is a processing region in which distance detection processing is performed by the distance detection unit 105 and object detection is then performed by the object detection unit 106. That is, the processing region 206 is a partial region (for the sake of convenience, referred to as a first region) of the common imaging region and in the first region, for the entire first region, distances for image elements in the partial region are calculated on the basis of the disparity between the plurality of imaging images. In addition, the processing region 206 is an image region in which the object detection processing is performed in the object detection 107, an region is further designated from a result thereof, and the distance detection processing is performed in the distance detection unit 105. That is, the processing region 205 is an region (for the sake of convenience, referred to as a second region) including another region different from the first region and in the second region, for a partial region which is a part of the second region, distances for image elements in the partial region are calculated on the basis of the disparity between the plurality of images. The first region, another region, the second region, and the partial region will be described later using FIGS. 6 and 7.

207 denotes a processing region of the processing region 206 designated by the region control unit 104, on the basis of a detection result of an object in the object detection 107. In this case, the traffic signal 204 is detected by the object detection unit 107 from the processing region 206, the processing region 207 including the traffic signal is designated by the region control unit 104, and the distance detection processing is performed for the processing region 207 in the distance detection unit 105.

Figure 4:
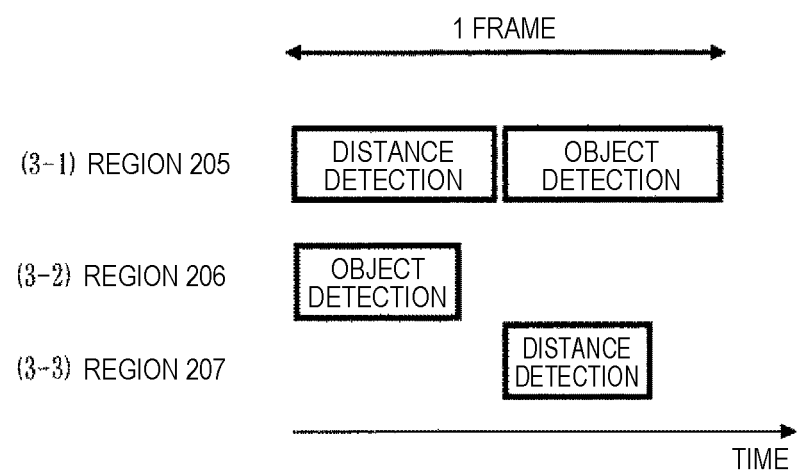
FIG. 4 is a diagram showing processing timing of the imaging device in the embodiment of the present invention.

FIG. 4 is a diagram showing processing timing in an embodiment of the imaging device according to the present invention. In the drawing, (3-1) shows processing timing of the processing region 205, (3-2) shows processing timing of the processing region 206, and (3-3) shows processing timing of the processing region 207 in the processing region 206.

In (3-1), for the processing region 205, the distance detection processing is performed by the distance detection unit 105 and the object detection is then performed by the object detection unit 106. In addition, in (3-2), for the processing region 206, the object detection is performed in the object detection 107. In addition, in (3-3), for the processing region 207 to be the processing region designated by the region control unit 104 on the basis of the result detected by the object detection unit 107 in (3-2), the distance detection processing is performed by the distance detection unit 105.

As described above, because the distance detection processing in the distance detection unit 105 is performed for only the designated necessary processing region, the entire region of the imaged image is not processed and the processing load can be reduced. In addition, because the operation of the distance detection unit 105 can perform time sharing processing in the processing of (3-1) and the processing of (3-3), for example, processing in one hardware realizing the distance detection unit 105 is enabled, so that a circuit scale can be reduced. In addition, the processing of (3-1) and the processing of (3-2) and (3-3) can be performed in parallel. These processing are performed in a period (that is, a processing cycle) of one frame to be an imaging interval of the imaging units 101 and 102 and a processing region to be designated is switched for each frame, so that detection processing suitable for various objects is enabled.

Figure 5:
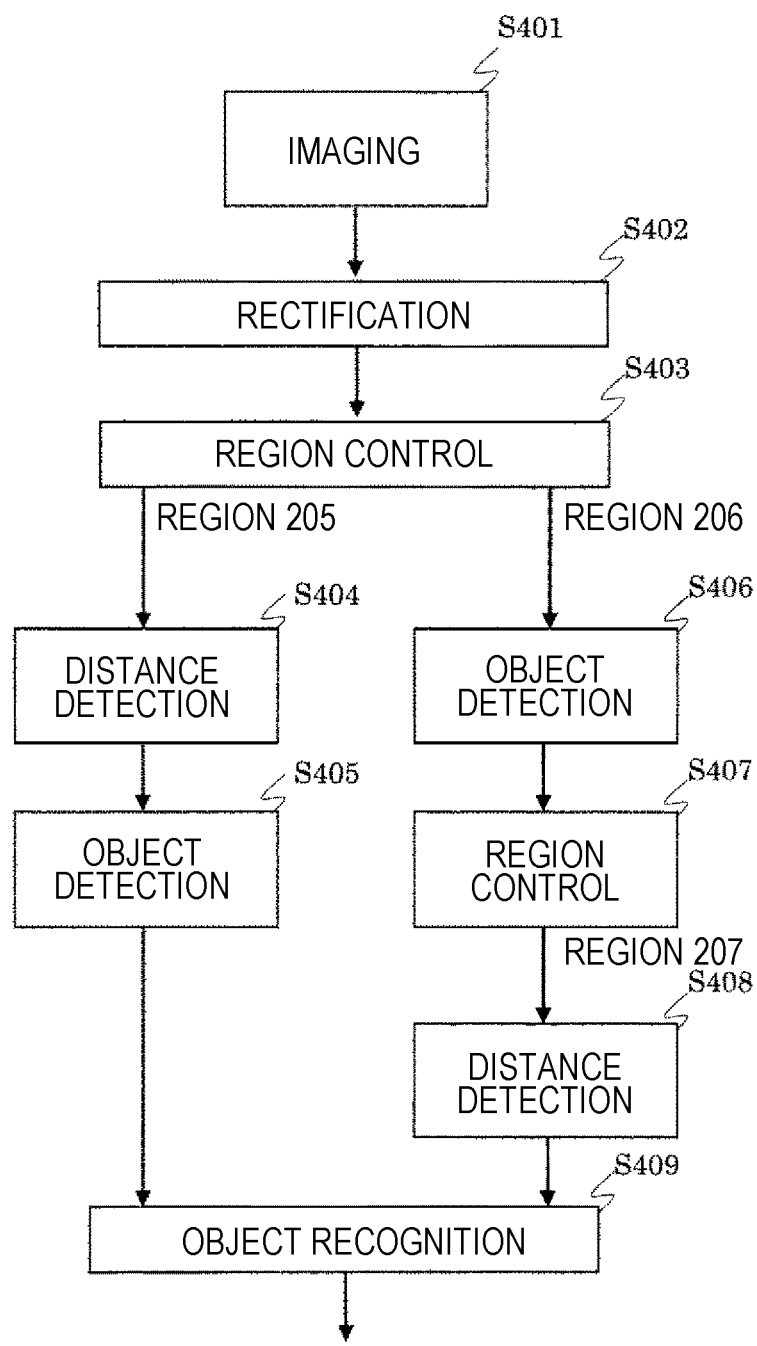
FIG. 5 is a diagram showing a processing flow of the imaging device in the embodiment of the present invention.

FIG. 5 is a diagram showing a processing flow in an embodiment of the imaging device according to the present invention. First, images are imaged by the imaging units 101 and 102 (S401: S represents step). For each of the imaged images, as described above, the brightness rectification, the lens distortion rectification, and the horizontal alignment are performed by the image rectifying unit 103 (S402). Next, a processing region of an image to be processed subsequently is designated by the region control unit 104 (S403).

First, for the processing region 205 shown in FIG. 3, a distance is detected by the distance detection unit 105 using the images imaged by the imaging units 101 and 102 (S404). In addition, an object is detected by the object detection unit 106 on the basis of obtained distance information (S405).

In addition, for the processing region 206 shown in FIG. 3, an object in the processing region 206 is detected by the object detection unit 107 using the image of either the imaging unit 101 or the imaging unit 102 (S406). This processing is also called monocular processing. In the monocular processing, the object is detected by a method such as pattern matching.

Next, a processing region to be distance-detected is designated by the region control unit 104 on the basis of an obtained detection result (S407). In addition, for the region 207, a distance is detected by the distance detection unit 105 using the images imaged by the imaging units 101 and 102 (S408).

Finally, object recognition processing is performed by the object recognition unit 108 on the basis of a detection result of the object in each processing region and an object recognition result is output (S409). The above processing is repeated, for example, every frame.

FIG. 6 is a diagram showing an example of an imaging image and an object recognition result in an embodiment of the imaging device according to the present invention. 501 denotes an image imaged by the imaging unit 101 at a certain point of time and the imaging unit 102 also images and acquires substantially the same image. In addition, 502, 503, and 504 denote object recognition results and frames in the image are not included in the imaged image and explicitly show recognized moving objects.

The pedestrian 202 and the pedestrian 203 detected from the processing region 205 and the traffic signal 204 of the processing region 207 detected from the processing region 206 are detected. As such, recognition of the object can be realized over the entire imaged image.

The processing region 205 corresponds to the first region described above. In addition, the processing region 206 corresponds to the second region described above and also corresponds to another region described above. In this example, the second region and another region are the same region. In addition, the processing region 207 corresponds to the partial region described above.

According to this embodiment, the processing region of the imaging image is divided and for the processing region 205, the distance of the subject is detected by the two imaging units and the object is detected on the basis of the result thereof and for the processing region 206, the object is detected from the image imaged by one imaging unit, the processing region is further designated on the basis of the detection result, and the distance of the object of the processing region is detected by the two imaging units. As a result, object recognition for the entire imaging image is enabled without increasing the processing load.

FIG. 7 is a diagram showing an example of region setting in an embodiment of the imaging device according to the present invention. As described above, 201 denotes the common imaging region of the images imaged by the imaging units 101 and 102.

602 denotes a processing region where a distance is detected by the distance detection unit 105 using the images imaged by the imaging units 101 and 102 as described above and an object is detected by the object detection unit 106 on the basis of obtained distance information and 603 denotes a processing region where, for a processing region in which an object of the processing region 603 is detected by the object detection unit 107 using the image of either the imaging unit 101 or the imaging unit 102 and a processing region to be distance-detected is designated by the region control unit 104 on the basis of an obtained detection result, a distance is detected by the distance detection unit 105 using the images imaged by the imaging units 101 and 102. For the processing regions, a position or a size thereof is controlled by the region control unit 104.

In FIG. 7(A), the processing region 602 is designated to the lower side of the common imaging region 201 and the processing region 603 is set to the upper side. As such, if the processing regions are designated, in the case where the pedestrian in front of the vehicle or the vehicle is detected in the processing region 602 as described above, the pedestrian or the vehicle can be detected with high precision and the traffic signal or the road sign can be detected in the processing region 603. In an example of FIG. 7(A), the processing region 602 corresponds to the first region described above. In addition, the processing region 603 corresponds to another region described above and corresponds to the second region described above and in this example, another region and the second region are the same region.

In addition, in FIG. 7(B), the processing region 603 is designated to the lower side of the common imaging region 201 and the processing region 602 is set to the upper side. For example, when a white line of a side strip is detected, a processing region is designated for object recognition by the object detection unit 107, so that the white line can be detected without increasing the processing load. In an example of FIG. 7(B), the processing region 602 corresponds to the first region described above. In addition, the processing region 603 corresponds to another region described above and corresponds to the second region described above and in this example, another region and the second region are the same region.

As shown in FIGS. 7(3) and 7(4), the processing region 602 and the processing region 603 can be designated to partially overlap each other. In examples of FIGS. 7(C) and 7(D), the processing region 602 corresponds to the first region described above. In addition, a processing region 603a corresponds to another region described above and the processing region 603 corresponds to the second region described above. In this example, another region is an region other than an overlapping region with the first region in the second region.

Region selection can be switched in units of frames to be imaging units. Although not shown in the drawings, by moving a processing region in a steering direction of the vehicle and designating the processing region or designating the processing region according to vertical and horizontal vibrations, the processing region can be finely limited and the load can be further reduced. In addition, when either the imaging unit 101 or the imaging unit 102 fails and imaging is disabled, the processing region 603 is designated over the entire image region 201, so that detection processing of the object can be continuously performed.

As such, by changing the designation of the processing region according to the target object to be detected, appropriate processing methods can be selected for various detection target objects and the image can be processed without increasing the processing load over the entire region of the image.

FIG. 8 is a schematic diagram of a waveform of a consumption current of the distance detection unit 105 at the time of a distance detection operation in an embodiment of the imaging device according to the present invention.

Figure 8A:
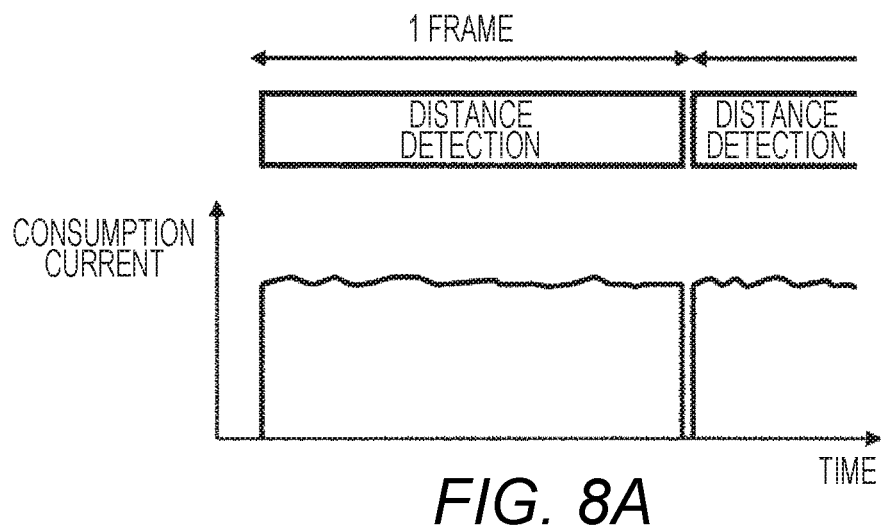
FIGS. 8A and 8B are diagrams showing an example of a consumption current of a distance detection unit in the embodiment of the present invention.
Figure 8B:
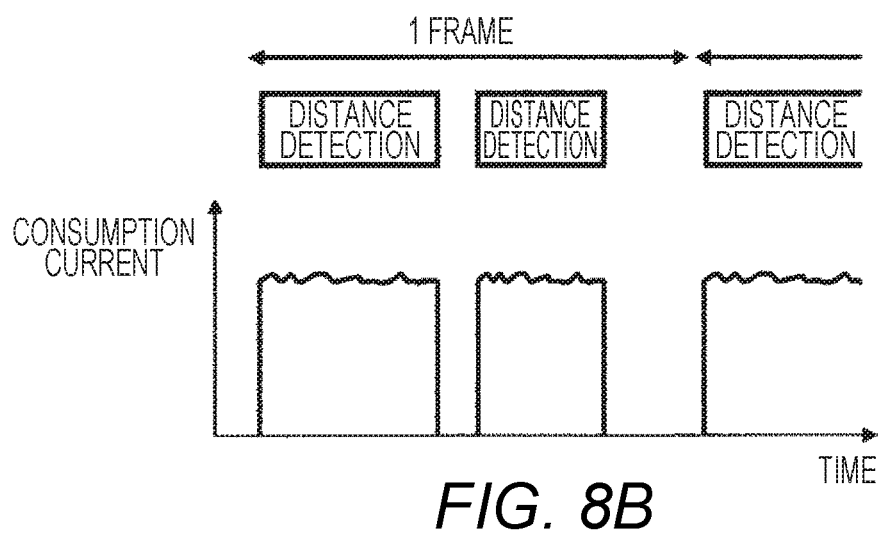

FIG. 8(A) shows a waveform of an operation current when distance detection by stereo processing is performed over an entire region of an imaging image without depending on the present invention and power is consumed over an entire frame. FIG. 8(B) shows a waveform of a current at the time of the distance detection operation in an embodiment of the imaging device according to the present invention. In FIG. 8(B), because the power is consumed at limited timing within the frame as compared with FIG. 8(A), reduction of the consumption power can be realized.

FIG. 9 is a diagram showing another embodiment of the region control in the imaging device according to the present invention. FIGS. 9(A) to 9(D) show region designation for each frame. In these examples, a size and a position of the processing region 603 are designated by the region control unit 104 and the processing region is designated while the position is deviated for each frame.

According to this embodiment, because the processing region of the object recognition processing by the object detection unit 107 is narrowed, the processing load can be further reduced. Because the processing region 603 moves for each frame, the entire region can be covered and it is suitable for the case of detecting an object not moving such as a traffic signal.

FIG. 10 is a diagram showing a configuration of another embodiment of an imaging device according to the present invention. An imaging device 1 is mounted on a vehicle such as an automobile and 801 in FIG. 10 denotes a vehicle control unit. An output of an object recognition unit 108 is input to the vehicle control unit 801.

The vehicle control unit 801 receives an object recognition result by the object recognition unit 108 and performs control on other device of a vehicle not illustrated in the drawings. As the control of the vehicle, there are lighting of a warning lamp to a driver, generation of a warning sound, deceleration by brake braking, and stop control due to an approach of a pedestrian or detection of a red light or a road sign, throttling and brake control at the time of following up a preceding vehicle, and steering angle control for other collision avoidance or lane maintenance. These vehicle control information is output from the imaging device 1 to other device not shown in the drawings via an in-vehicle network.

In FIG. 10, although an example of the case where the vehicle control unit 801 is stored in the same casing as the imaging device 1 is shown, the present invention is not limited thereto and imaging units 101 and 102 may be provided as separate casings as described above.

Figure 11:
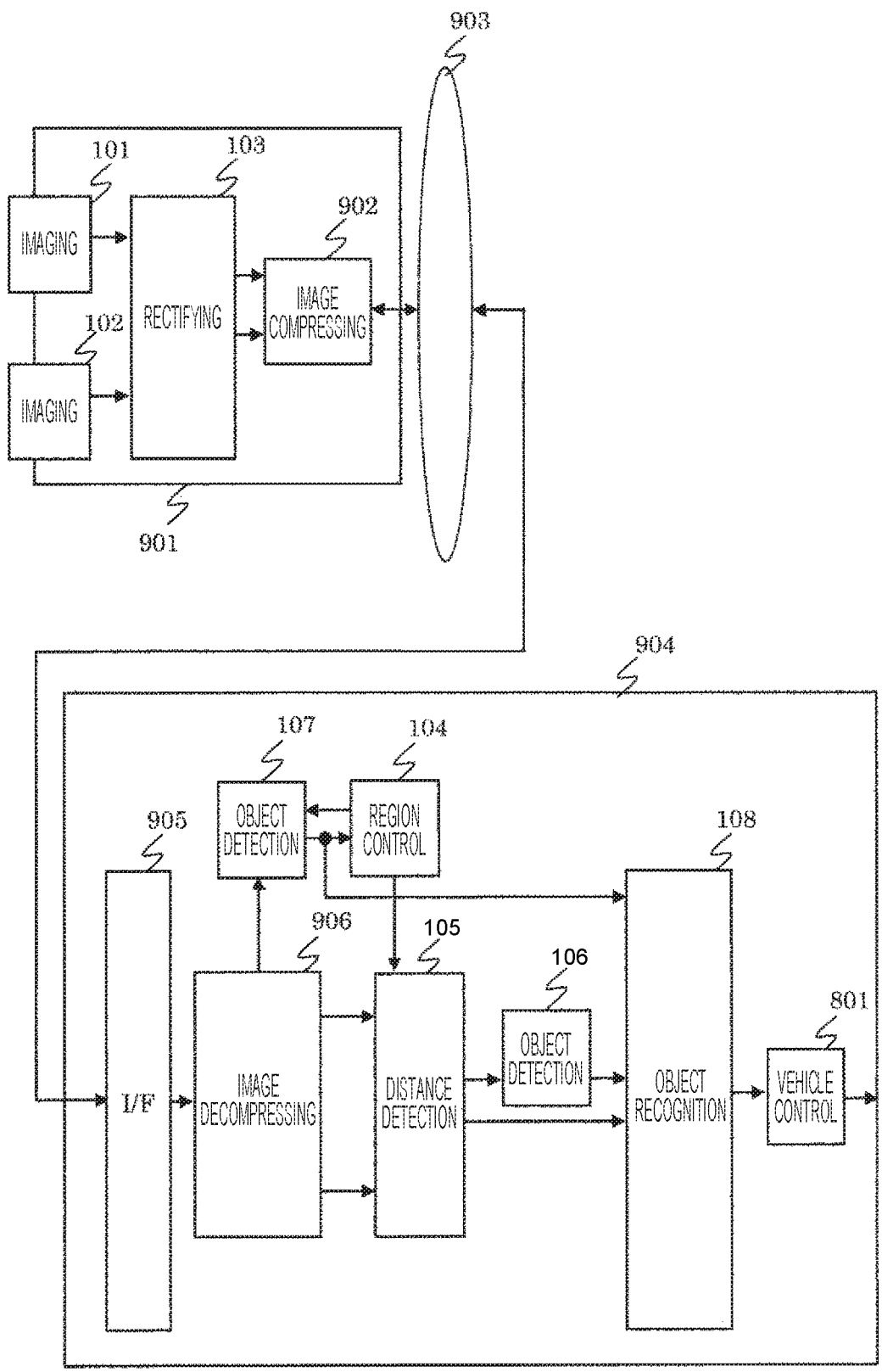
FIG. 11 is a diagram showing a configuration of an imaging device in still another embodiment of the present invention.

FIG. 11 is a diagram showing a configuration of still another embodiment of an imaging device according to the present invention. 901 denotes a network imaging unit, 903 denotes a local region network (LAN), and 904 denotes a control unit. The network imaging unit 901 is connected to the control unit 904 via the LAN 903. In addition, 902 denotes an image compressing/interface unit, 905 denotes a network interface unit, and 906 denotes an image decompressing unit.

For images imaged by an imaging unit 101 and an imaging unit 102, brightness rectification, lens distortion rectification, and horizontal alignment are performed in an image rectifying unit 103. Next, the image compressing/interface unit 902 compresses an image from the image rectifying unit 103 and transmits the image to the LAN 903. As an image compressing method, there is a method using an intra frame compressing method of performing compressing in one image without using a temporal correlation of a plurality of images to reduce processing time. In addition, a video compression encoding method may be selected and switched.

The image compressing/interface unit 902 generates compression encoding data and transmits the data according to a predetermined network protocol. The image rectifying unit 103 performs processing at a front stage of the image compressing/interface unit 902 and image compressing is performed after rectifying the lens distortion or the like, so that highly efficient image compressing and high image quality are expected. However, the image rectifying unit 103 may be provided at a rear stage of the image decompressing unit 906 of the control unit 904.

In the control unit 904, the network interface unit 905 receives compressed image data via the LAN 903. The compressed image data received by the network interface unit 905 of the control unit 904 is decompressed to the original image in the image decompressing unit 906. For an image of a processing region designated by an region control unit 104, a distance detection unit 105 and an object detection unit 107 perform the processing described above. The subsequent processing is as described above.

According to this embodiment, because the image or the imaging timing information is exchanged via the LAN 906, a processing amount of the imaging unit side can be reduced, a weight of the imaging unit side can be reduced, power consumption can be reduced, and dimensional restriction at the time of vehicle installation can be reduced by reduction of a casing.

The present invention is not limited to the embodiments described above and various modifications are included.

For example, the embodiments are described in detail to facilitate the description of the present invention and the present invention is not limited to including all of the described configurations. In addition, a part of the configurations of the certain embodiment can be replaced by the configurations of other embodiments or the configurations of other embodiments can be added to the configurations of the certain embodiment. In addition, for a part of the configurations of the individual embodiments, addition/removal/replacement of other configurations can be performed.

A part or all of the individual configurations may be configured using hardware or may be configured to be realized by executing programs by a processor. In addition, only control lines or information lines necessary for explanation are illustrated and the control lines or information lines do not mean all control lines or information lines necessary for a product. In actuality, almost all configurations may be mutually connected.

REFERENCE SIGNS LIST 1 imaging device
101 to 102 imaging unit
103 image rectifying unit
104 region control unit
105 distance detection unit
106 object detection unit
107 object detection unit
108 object recognition unit
201 common imaging region
202 to 204 subject
205 to 207 processing region
602 to 603 processing region
801 vehicle control unit
901 network imaging unit
902 image compressing/interface unit
903 LAN
904 control unit
905 network interface unit
906 image decompressing unit

The invention claimed is:

1. An imaging device having a plurality of imaging units configured to obtain images,
   wherein the imaging device is configured to divide each of the images into a plurality of regions including a first region, a second region different from the first region, and a third region that is a part of the second region;
   wherein the imaging device is configured to designate the plurality of regions in which distances are to be determined;
   wherein the imaging device is configured to determine a first distance to a first image element of a plurality of first image elements in the first region based on a disparity between the images by stereo processing over the entire first region;
   wherein the imaging device is configured to determine a second distance to a second image element in the third region, based on the disparity between the images; and
   wherein the plurality of first image elements in the first region are grouped into a group of image elements when their respective distances are approximately the same, and when a size of the group of image elements is a constant value the group of image elements is detected as a first object;
   wherein the imaging device is configured to perform a first object detection processing for sensing, by stereo processing for calculating the distance using the disparity, a distance for each of the plurality of image elements in the first region, then extracting the group of the image elements based on the sensed distances, and detecting the first object, and to perform a second object detection processing for detecting a distance to a second object by the stereo processing for the partial region; and wherein the imaging device detects a third object by monocular processing for the second region, performs the stereo processing for calculating the distance using the disparity for the partial region including the third object, and senses the distance to the third object.

2. The imaging device according to claim 1,
wherein whether object sensing is performed by the first object detection processing or the second object detection processing is set according to types of detection target objects.

3. The imaging device according to claim 1,
wherein the first object detection processing and the second object detection processing are performed in parallel within a processing cycle.

4. The imaging device according to claim 3,
wherein the stereo processing performed by the first object detection processing and the second object detection processing is performed in a time sharing manner.

5. The imaging device according to claim 1,
wherein the first object detection processing detects a pedestrian or a vehicle.

6. The imaging device according to claim 1,
wherein the second object detection processing detects a signal, a sign, or a division line.

7. The imaging device according to claim 1,
wherein the imaging device includes a vehicle control unit that controls a motion of a vehicle, and
the vehicle control unit controls the vehicle on the basis of an object recognition result of an object recognition unit.

* * * * *